(12) United States Patent
Satomi et al.

(10) Patent No.: US 11,802,531 B2
(45) Date of Patent: Oct. 31, 2023

(54) HYBRID ELECTRIC VEHICLE

(71) Applicant: TOYOTA JIDOSHA KABUSHIKI KAISHA, Aichi-ken (JP)

(72) Inventors: Tomohiko Satomi, Nagoya (JP); Koji Ichikawa, Aichi-ken (JP); Masanao Idogawa, Nagoya (JP); Tatsuro Shimada, Toyota (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 18/056,721

(22) Filed: Nov. 18, 2022

(65) Prior Publication Data

US 2023/0250783 A1 Aug. 10, 2023

(30) Foreign Application Priority Data

Feb. 7, 2022 (JP) ................. 2022-017214

(51) Int. Cl.
*F02M 65/00* (2006.01)
*B60K 6/24* (2007.10)
*F02D 41/38* (2006.01)

(52) U.S. Cl.
CPC ............ *F02M 65/008* (2013.01); *B60K 6/24* (2013.01); *F02D 41/38* (2013.01); *B60Y 2200/92* (2013.01); *B60Y 2400/433* (2013.01); *F02D 2041/389* (2013.01)

(58) Field of Classification Search
CPC ........ F02M 65/008; B60K 6/24; F02D 41/38; F02D 2041/389; B60Y 2200/92; B60Y 2400/433
See application file for complete search history.

(56) References Cited

U.S. PATENT DOCUMENTS

| 2015/0204266 | A1 | 7/2015 | Mashiki |
| 2017/0292463 | A1* | 10/2017 | Ochi ................. F02D 37/02 |
| 2019/0211787 | A1* | 7/2019 | Thomas ............. F02D 41/40 |

FOREIGN PATENT DOCUMENTS

| JP | 2009002196 A | 1/2009 |
| JP | 2014034972 A | 2/2014 |
| JP | 2017166384 A | 9/2017 |
| WO | WO-2006112422 A1 * | 10/2006 ............ B60K 6/445 |

* cited by examiner

*Primary Examiner* — Joseph J Dallo
(74) *Attorney, Agent, or Firm* — HAUPTMAN HAM, LLP (57) ABSTRACT

A hybrid electric vehicle includes an engine having an in-cylinder injection valve, a fuel supply device that supplies fuel to the in-cylinder injection valve, a motor that can generate an electric power through the use of a motive power output from the engine and can output a running motive power, and an electrical storage device that exchanges electric power with the motor. A deposit removal process where deposits adherent to the in-cylinder injection valve are removed by setting a pressure of fuel supplied to the in-cylinder injection valve to a predetermined pressure higher than a normal pressure and injecting fuel from the in-cylinder injection valve is performed during the performance of a forcible charging process for the electrical storage device, and the forcible charging process is continued until the pressure of fuel is returned to the normal pressure after the end of the deposit removal process.

15 Claims, 5 Drawing Sheets

HYBRID ELECTRIC VEHICLE

CROSS-REFERENCE TO RELATED APPLICATION

This application claims priority to Japanese Patent Application No. 2022-017214 filed on Feb. 7, 2022, incorporated herein by reference in its entirety.

BACKGROUND

1. Technical Field

The disclosure relates to a hybrid electric vehicle, and more particularly, to a hybrid electric vehicle that is equipped with an engine having in-cylinder injection valves and a motor.

2. Description of Related Art

Conventionally, as this kind of art, it is proposed to restrain deposits from adhering to an in-cylinder injection valve by adjusting the pressure of fuel supplied to the in-cylinder injection valve in accordance with the temperature of a nozzle of the in-cylinder injection valve (e.g., see Japanese Unexamined Patent Application Publication No. 2017-166384 (JP 2017-166384 A)). In general, when deposits in a certain deposit amount or more adhere to the in-cylinder injection valve, a deposit removal process for removing the deposits by raising the pressure of fuel supplied to the in-cylinder injection valve and injecting fuel from the in-cylinder injection valve is performed.

SUMMARY

However, in the foregoing deposit removal process, the pressure of fuel supplied to the in-cylinder injection valve is raised and fuel is injected from the in-cylinder injection valve. Therefore, at the time of low-load operation when, for example, an engine is in idling operation, a required fuel injection amount may become smaller than a minimum fuel injection amount. In this case, fuel in the minimum fuel injection amount is injected from the in-cylinder injection valve, so the fuel injection amount becomes excessively large. Unburnt fuel is discharged to cause a deterioration in emission properties unless an intake air amount is adjusted. When the intake air amount is adjusted, the output of the engine becomes excessively large. Besides, fuel injection needs to be carried out to reduce the pressure of fuel supplied to the in-cylinder injection valve to a normal pressure even after the end of the deposit removal process. Therefore, the fuel injection amount may become excessively large in the same manner as at the time of the deposit removal process.

It is a main object of a hybrid electric vehicle of the disclosure to suppress the occurrence of inconveniences resulting from a decrease in the amount of fuel injection at the time of a deposit removal process or a subsequent pressure reduction process below a minimum fuel injection amount.

The hybrid electric vehicle of the disclosure has adapted the following means to achieve the aforementioned main object.

The hybrid electric vehicle of the disclosure is a hybrid electric vehicle equipped with an engine having an in-cylinder injection valve, a fuel supply device that supplies fuel to the in-cylinder injection valve, a motor that can generate an electric power through the use of a motive power output from the engine and that can output a running motive power, an electrical storage device that exchanges electric power with the motor, and a control device that controls the engine, the fuel supply device, and the motor. The control device carries out a deposit removal process in which deposits that have adhered to the in-cylinder injection valve are removed by setting a pressure of fuel supplied to the in-cylinder injection valve to a predetermined pressure higher than a normal pressure and injecting fuel from the in-cylinder injection valve, during the performance of a forcible charging process for the electrical storage device, and continues the forcible charging process until the pressure of fuel is returned to the normal pressure after the end of the deposit removal process.

In this hybrid electric vehicle of the disclosure, the deposit removal process in which the deposits that have adhered to the in-cylinder injection valve are removed by setting the pressure of fuel supplied to the in-cylinder injection valve to the predetermined pressure higher than the normal pressure and injecting fuel from the in-cylinder injection valve is performed during the performance of the forcible charging process for the electrical storage device. As the forcible charging process for the electrical storage device, it is possible to mention a process in which the engine is controlled such that a motive power larger than the running motive power that is required for running is output from the engine, the motor is controlled in such a manner as to generate an electric power by a motive power obtained by subtracting the running motive power from the motive power output from the engine, and the electrical storage device is charged with the electric power generated by the motor. By performing the deposit removal process during the performance of this forcible charging process for the electrical storage device, the deposit removal process is performed when a certain output is output from the engine. Therefore, the required fuel injection amount can be made equal to or larger than the minimum fuel injection amount, and the occurrence of inconveniences (a deterioration in emission properties and an excessively large output of the engine) resulting from a decrease in the required fuel injection amount below the minimum fuel injection amount can be avoided. Incidentally, the cases of "performing the deposit removal process during the performance of the forcible charging process for the electrical storage device" include a case where the forcible charging process for the electrical storage device is performed prior to the performance of the deposit removal process in performing the deposit removal process, and a case where the deposit removal process is performed when the forcible charging process for the electrical storage device is performed. Besides, the forcible charging process is continued until the pressure of fuel is returned to the normal pressure after the end of the deposit removal process. Therefore, the required fuel injection amount can be made equal to or larger than the minimum fuel injection amount at the time of pressure reduction after the end of the deposit removal process, and the occurrence of inconveniences resulting from a decrease in the required fuel injection amount below the minimum fuel injection amount can be avoided. Incidentally, the cases of "continuing the forcible charging process until the pressure of fuel is returned to the normal pressure after the end of the deposit removal process" also include a case where the forcible charging process is forcibly continued until the pressure of fuel is returned to the normal pressure, a case where the forcible charging process is forcibly continued for a time that is needed to return the pressure of fuel to the normal pressure after the end of the deposit removal process, and a case where the deposit removal process is ended at a timing preceding the end of the forcible charging process by the time that is needed to return the pressure of fuel to the normal pressure. As a result, the occurrence of inconveniences resulting from a decrease in the fuel injection amount below the minimum fuel injection amount at the time of the deposit removal process or the subsequent pressure reduction process can be suppressed.

Incidentally, the engine may have the in-cylinder injection valve arranged in the vicinity of a center of a top of a cylinder, and an ignition plug arranged in the vicinity of the in-cylinder injection valve. In this configuration, the temperature of the nozzle of the in-cylinder injection valve is high, so thermosetting deposits are likely to adhere to the in-cylinder injection valve. In order to remove these thermosetting deposits, the pressure of fuel supplied to the in-cylinder fuel injection valve needs to be further raised. Therefore, when the deposit removal process is performed at the time of low-load operation of the engine, the required fuel injection amount tends to become smaller than the minimum fuel injection amount, so an appropriate measure can thus be taken.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Next, modes for carrying out the disclosure will be described using the embodiments.

Figure 1:
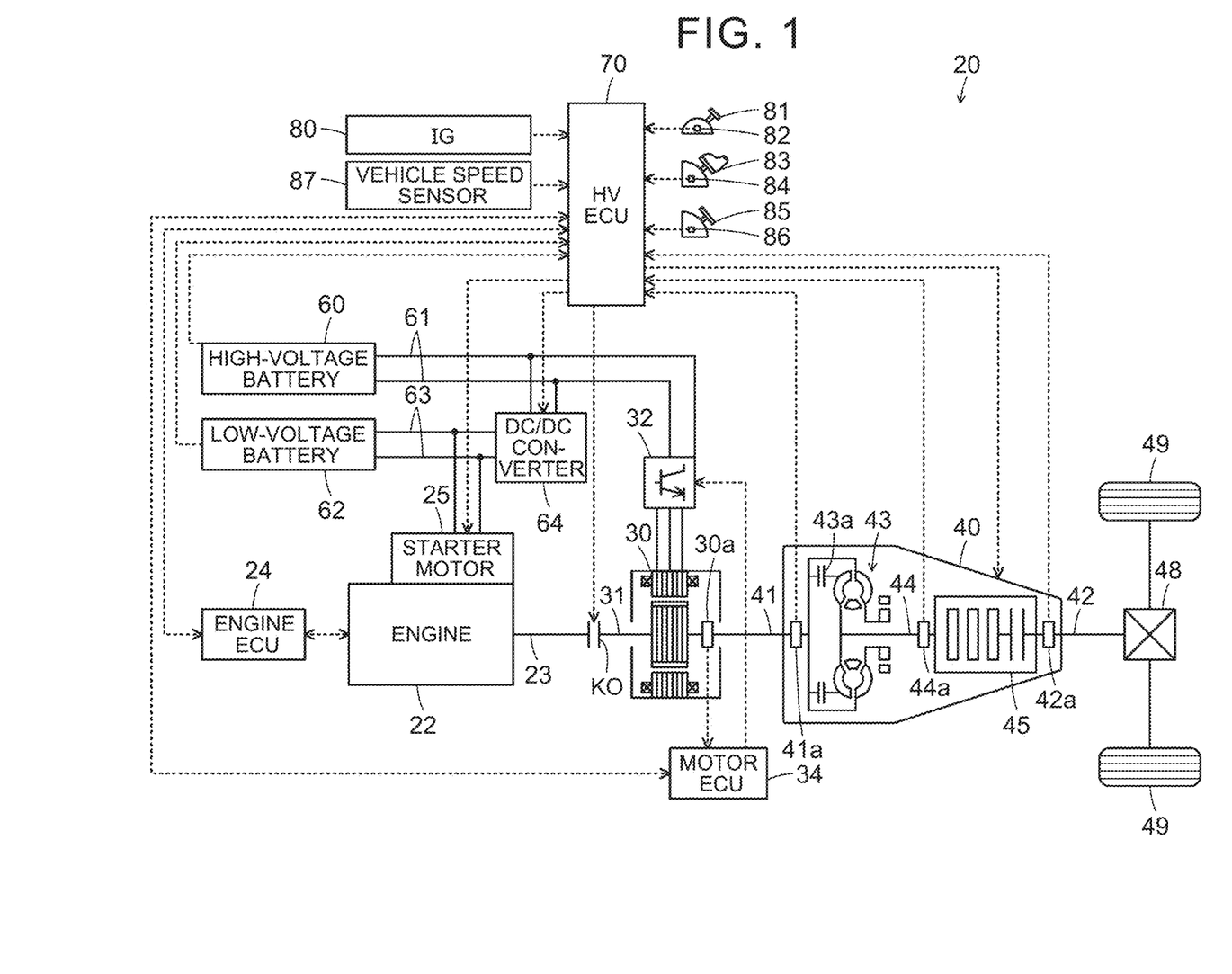
FIG. 1 is a block diagram showing the outline of the configuration of a hybrid electric vehicle 20 as one of the embodiments of the disclosure.
Figure 2:
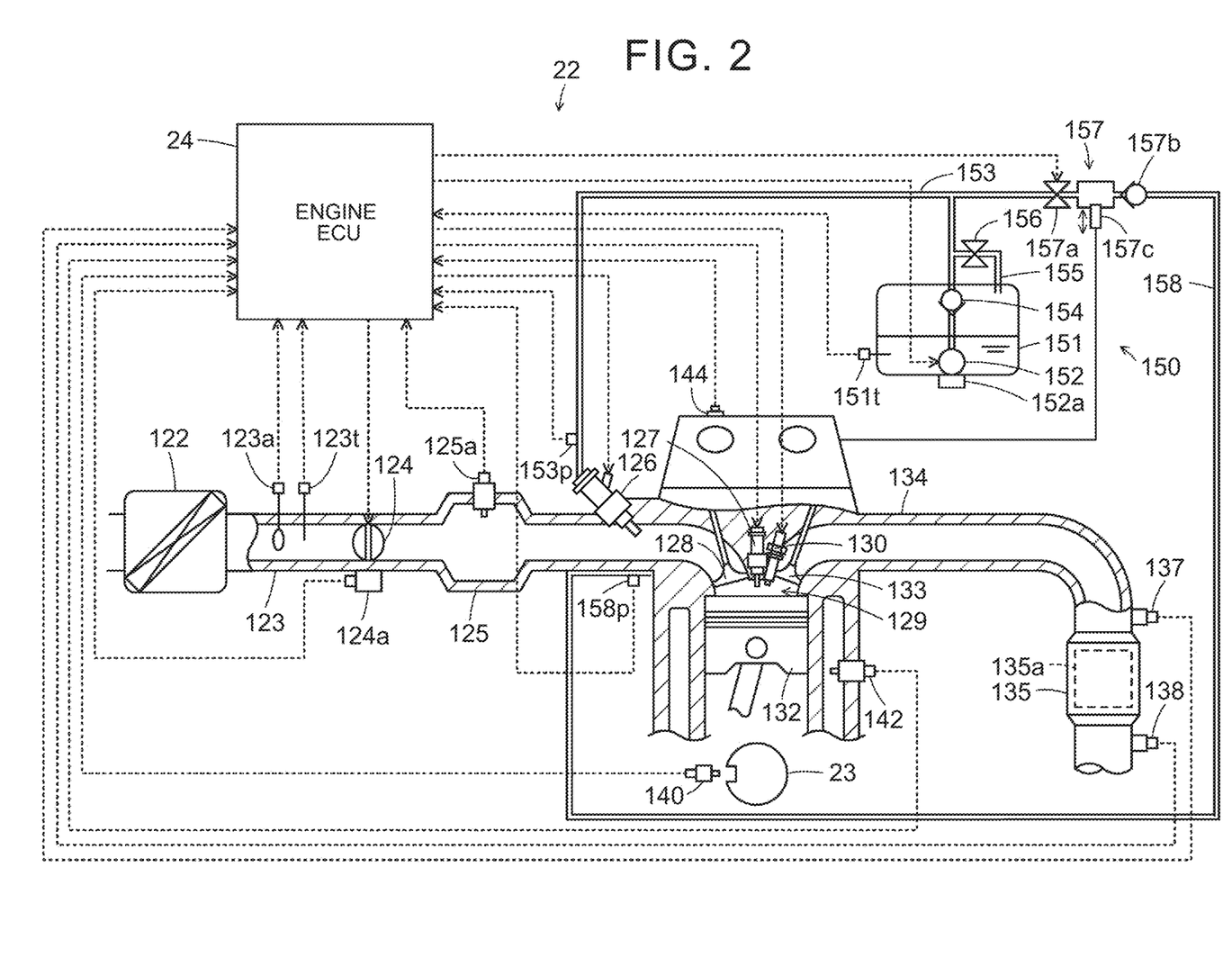
FIG. 2 is a block diagram showing the outline of the configuration of an engine 22.

FIG. 1 is a block diagram showing the outline of the configuration of a hybrid electric vehicle 20 as one of the embodiments of the disclosure. FIG. 2 is a block diagram showing the outline of the configuration of an engine 22 with which the hybrid electric vehicle 20 is mounted. As shown in FIG. 1, the hybrid electric vehicle 20 of the embodiment is equipped with the engine a motor 30, an inverter 32, a clutch K0, an automatic transmission device 40, a high-voltage battery 60, a low-voltage battery 62, a DC/DC converter 64, and a hybrid electronic control unit (hereinafter referred to as "the HVECU") 70.

The engine 22 is configured as a six-cylinder internal combustion engine that outputs motive power through four strokes, namely, an intake stroke, a compression stroke, an expansion (explosive combustion) stroke, and an exhaust stroke through the use of a fuel, for example, gasoline or light oil. As shown in FIG. 2, the engine 22 has a port injection valve 126 that injects fuel that is supplied from a fuel supply device 150 to an intake port via a low-pressure supply pipe 153, and an in-cylinder injection valve 127 that injects fuel that is supplied from the fuel supply device 150 into a cylinder via a high-pressure supply pipe 158. The in-cylinder injection valve 127 is arranged substantially at the center of a top of a combustion chamber 129, and injects fuel in a spraying manner. An ignition plug 130 is arranged in the vicinity of the in-cylinder injection valve 127 such that the fuel sprayed from the in-cylinder injection valve 127 can be ignited. The engine 22 has the port injection valve 126 and the in-cylinder injection valve 127, and can thereby be operated in a port injection mode, an in-cylinder injection mode, or a shared injection mode. In the port injection mode, the air cleaned by an air cleaner 122 is sucked into an intake pipe 123 and caused to flow past a throttle valve 124 and a surge tank 125, fuel is injected from the port injection valve 126 located downstream of the surge tank 125 in the intake pipe 123, and the air and the fuel are mixed with each other. This air-fuel mixture is then sucked into the combustion chamber 129 via an intake valve 128 and burned in an explosive manner through electric sparks generated by the ignition plug 130 to convert reciprocating motion of a piston 132 that is depressed through the energy of explosive combustion in a cylinder bore into rotational motion of a crankshaft 23. In the in-cylinder injection mode, air is sucked into the combustion chamber 129 in the same manner as in the port injection mode, fuel is injected from the in-cylinder injection valve 127 in an intake stroke and a compression stroke, and the air-fuel mixture is burned in an explosive manner through electric sparks generated by the ignition plug 130 to obtain rotational motion of the crankshaft 23. In the shared injection mode, fuel is injected from the port injection valve 126 and fuel is injected from the in-cylinder injection valve 127 in an intake stroke and a compression stroke in sucking air into the combustion chamber 129, and the air-fuel mixture is burned in an explosive manner through electric sparks generated by the ignition plug 130 to obtain rotational motion of the crankshaft 23. A changeover is made among these injection modes based on an operating state of the engine 22. The exhaust gas discharged from the combustion chamber 129 to an exhaust pipe 134 via an exhaust valve 133 is discharged to the outside air via an emission control device 135. The emission control device 135 has an emission control catalyst (three-way catalyst) 135a that removes noxious components such as carbon monoxide (CO), hydrocarbons (HC), and nitrogen oxides (NOx) from exhaust gas.

The fuel supply device 150 is configured as a device that supplies the fuel in a fuel tank 151 to the port injection valve 126 and the in-cylinder injection valve 127 in the engine 22. The fuel supply device 150 is equipped with the fuel tank 151, a feed pump 152, the low-pressure supply pipe 153, a check valve 154, a relief pipe 155, a relief valve 156, a high-pressure pump 157, and the high-pressure supply pipe 158.

The feed pump 152 is configured as an electric pump that operates by being supplied with electric power from a battery (not shown), and is arranged in the fuel tank 151. The feed pump 152 supplies the fuel in the fuel tank 151 to the low-pressure supply pipe 153. The low-pressure supply pipe 153 is connected to the port injection valve 126. The check valve 154 is provided in the low-pressure supply pipe 153 to allow fuel to flow from the feed pump 152 side to the port injection valve 126 side and keep fuel from flowing in the opposite direction.

The relief pipe 155 is connected to the low-pressure supply pipe 153 and the fuel tank 151. The relief valve 156 is provided in the relief pipe 155, closes when the pressure of fuel in the low-pressure supply pipe 153 is lower than a threshold Pflolim, and opens when the pressure of fuel in the low-pressure supply pipe 153 is equal to or higher than the threshold Pflolim. When the relief valve 156 opens, part of the fuel in the low-pressure supply pipe 153 is returned to the fuel tank 151 via the relief pipe 155. In this manner, the pressure of fuel in the low-pressure supply pipe 153 is restrained from becoming excessively high.

The high-pressure pump 157 is configured as a pump that is driven by the motive power from the engine 22 (through rotation of an intake camshaft that opens/closes the intake valve 128 in the embodiment), that pressurizes the fuel in the low-pressure supply pipe 153, and that supplies the fuel to the high-pressure supply pipe 158. The high-pressure pump 157 has an electromagnetic valve 157a that is connected to a suction port thereof and that opens/closes in pressurizing fuel, a check valve 157b that is connected to a discharge port thereof, that keeps fuel from flowing in the opposite direction, and that maintains the pressure of fuel in the high-pressure supply pipe 158, and a plunger 157c that operates (moves in a vertical direction in FIG. 1) through rotation of the engine 22 (rotation of the intake camshaft). The high-pressure pump 157 pressurizes the fuel that is supplied to the high-pressure supply pipe 158 by sucking the fuel in the low-pressure supply pipe 153 when the electromagnetic valve 157a is opened, and intermittently delivering the fuel compressed by the plunger 157c to the high-pressure supply pipe 158 via the check valve 157b when the electromagnetic valve 157a is closed, during the operation of the engine 22.

Operation control of the engine 22 is performed by the engine ECU 24. Although not shown in the drawing, the engine ECU 24 is equipped with a microcomputer having a CPU, a ROM, a RAM, a flash memory, input/output ports, and a communication port.

Signals from various sensors that are needed to perform operation control of the engine 22 are input to the engine ECU 24 via the input ports respectively. As the signals input to the engine ECU 24, it is possible to mention, for example, a crank angle θcr from a crank position sensor 140 that detects a rotational position of the crankshaft 23 of the engine 22, and a coolant temperature Tw from a coolant temperature sensor 142 that detects a temperature of coolant in the engine 22. It is also possible to mention cam angles θci and θco from a cam position sensor 144 that detects a rotational position of the intake camshaft that opens/closes the intake valve 128 and a rotational position of an exhaust camshaft that opens/closes the exhaust valve 133. It is also possible to mention a throttle opening degree TH from a throttle position sensor 124a that detects a position of the throttle valve 124, an intake air amount Qa from an airflow meter 123a attached to the intake pipe 123 upstream of the throttle valve 124, an intake air temperature Ta from a temperature sensor 123t attached to the intake pipe 123 upstream of the throttle valve 124, and a surge pressure Ps from a pressure sensor 125a attached to the surge tank 125. It is also possible to mention a front air-fuel ratio AF1 from a front air-fuel ratio sensor 137 attached to the exhaust pipe 134 upstream of the emission control device 135, and a rear air-fuel ratio AF2 from a rear air-fuel ratio sensor 138 attached to the exhaust pipe 134 between the emission control device 135 and a PM filter 136, it is also possible to mention a fuel temperature Tftnk from a fuel temperature sensor 151t attached to the fuel tank 151, a rotational speed Np of the feed pump 152 from a rotational speed sensor 152a attached to the feed pump 152, a low fuel pressure (the pressure of fuel supplied to the port injection valve 126) PL from a fuel pressure sensor 153p attached to the low-pressure supply pipe 153 in the vicinity of the port injection valve 126 (e.g., a low-pressure delivery pipe), and a high fuel pressure (the pressure of fuel supplied to the in-cylinder injection valve 127) PH from a fuel pressure sensor 158p attached to the high-pressure supply pipe 158 in the vicinity of the in-cylinder injection valve 127 (e.g., a high-pressure delivery pipe).

Various control signals for performing operation control of the engine 22 are output from the engine ECU 24 via the output ports respectively. As the signals that are output from the engine ECU 24, it is possible to mention, for example, a control signal to the throttle valve 124, a control signal to the port injection valve 126, a control signal to the in-cylinder injection valve 127, and a control signal to the ignition plug 130. It is also possible to mention a control signal to the feed pump 152 of the fuel supply device 150, and a control signal to the electromagnetic valve 157a of the high-pressure pump 157.

The engine ECU 24 is connected to the HVECU 70 via the communication port. The engine ECU 24 computes a rotational speed Ne of the engine 22 based on the crank angle θcr of the engine 22 from the crank position sensor 140. Besides, the engine ECU 24 computes a load factor (the ratio of a volume of air actually sucked in one cycle to a volumetric displacement of the engine 22 per cycle) KL based on the intake air amount Qa from the airflow meter 123a and the rotational speed Ne of the engine 22.

As shown in FIG. 1, a starter motor 25 for cranking the engine 22 is connected to the crankshaft 23 of the engine 22. The starter motor 25 is connected, together with the low-voltage battery 62, to a low voltage-side electric power line 63, and is controlled by the HVECU 70.

The motor 30 is configured as a synchronous generator motor, and has a rotor having a rotor core in which a permanent magnet is embedded, and a stator having a stator core around which a three-phase coil is wound. A rotary shaft 31 to which the rotor of the motor 30 is fixed is connected to the crankshaft 23 of the engine 22 via the clutch K0, and is connected to an input shaft 41 of an automatic transmission 45. The inverter 32 is used to drive the motor 30, and is connected to a high voltage-side electric power line 61. The motor 30 is rotationally driven through switching control of a plurality of switching elements of the inverter 32 by a motor electronic control unit (hereinafter referred to as "the motor ECU") 34.

Although not shown in the drawing, the motor ECU 34 is equipped with a microcomputer having a CPU, a ROM, a RAM, a flash memory, input/output ports, and a communication port. Signals from various sensors are input to the motor ECU 34 via the input ports respectively. As the signals that are input to the motor ECU 34, it is possible to mention, for example, a rotational position θm from a rotational position sensor 30a that detects a rotational position of the rotor (the rotary shaft 31) of the motor 30, and phase currents Iu and Iv from current sensors that detect phase currents of the phases of the motor 30 respectively. A control signal to the inverter 32 and the like are output from the motor ECU 34 via the output ports respectively. The motor ECU 34 is connected to the HVECU 70 via the communication port. The motor ECU 34 computes a rotational speed Nm of the motor 30 based on the rotational position θm of the rotor (the rotary shaft 31) of the motor 30 from the rotational position sensor 30a.

The clutch K0 is configured as, for example, a hydraulically driven friction clutch. By being controlled by the HVECU 70, the clutch K0 connects the crankshaft 23 of the engine 22 and the rotary shaft 31 of the motor 30 to each other, and disconnects the crankshaft 23 of the engine 22 and the rotary shall 31 of the motor 30 from each other.

The automatic transmission device 40 has a torque converter 43, and the automatic transmission 45 having, for example, six speeds. The torque converter 43 is configured as a generally known hydraulic power transmission. The torque converter 43 transmits the motive power of the input shaft 41 connected to the rotary shaft 31 of the motor 30 to a transmission input shaft 44 that is an input shaft of the automatic transmission 45 with the torque amplified, or directly transmits the motive power thereto with the torque not amplified. The automatic transmission 45 has the transmission input shaft 44, an output shaft 42 coupled to driving wheels 49 via a differential gear 48, a plurality of planetary gears, and a plurality of hydraulically driven frictional engagement elements (clutches and brakes). Each of the frictional engagement elements has a hydraulic servo that is constituted of a piston, a plurality of frictional engagement plates (friction plates and separator plates), an oil chamber to which hydraulic oil is supplied, and the like. The automatic transmission 45 forms forward speeds from a first speed to a sixth speed and a backward speed through engagement and release of the frictional engagement elements, and transmits motive power between the transmission input shaft 44 and the output shaft 42. Hydraulic oil from a mechanical oil pump or an electric oil pump is adjusted in pressure and supplied to the clutch K0 and the automatic transmission 45 by an oil pressure control device (not shown). The oil pressure control device has a valve body in which a plurality of oil passages are formed, a plurality of regulator valves, a plurality of linear solenoid valves, and the like. The oil pressure control device is controlled by the HVECU 70.

The high-voltage battery 60 is configured as a lithium-ion secondary battery or a nickel hydride secondary battery with a rated voltage of, for example, about several hundred V, and is connected, together with the inverter 32, to the high voltage-side electric power line 61. The low-voltage battery 62 is configured as a lead storage battery with a rated voltage of, for example, about 12 V or 14 V, and is connected, together with the starter motor 25 and an alternator 26, to the low voltage-side electric power line 63. The DC/DC converter 64 is connected to the high voltage-side electric power line 61 and the low voltage-side electric power line 63. The DC/DC converter 64 supplies the electric power of the high voltage-side electric power line 61 to the low voltage-side electric power line 63 with the voltage lowered.

Although not shown in the drawing, the HVECU 70 is equipped with a microcomputer having a CPU, a ROM, a RAM, a flash memory, input/output ports, and communication ports. Signals from various sensors are input to the HVECU 70 via the input ports respectively. As the signals that are input to the HVECU 70, it is possible to mention, for example, a rotational speed Nin from a rotational speed sensor 41a attached to the input shaft 41 of the automatic transmission device 40, a rotational speed Nmi from a rotational speed sensor 44a attached to the transmission input shaft 44 of the automatic transmission device 40, and a rotational speed Nout from a rotational speed sensor 42a attached to the output shaft 42 of the automatic transmission device 40. It is also possible to mention a voltage Vbh of the high-voltage battery 60 from a voltage sensor attached between terminals of the high-voltage battery 60, a current Ibh of the high-voltage battery 60 from a current sensor attached to the output terminal of the high-voltage battery 60, and a voltage Vbl from a voltage sensor attached between terminals of the low-voltage battery 62. It is also possible to mention an ignition signal from an ignition switch 80, a shift position SP from a shift position sensor 82 that detects an operating position of a shift lever 81, an accelerator depression amount Acc from an accelerator pedal position sensor 84 that detects a depression amount of an accelerator pedal 83, a brake pedal position BP from a brake pedal position sensor 86 that detects a depression amount of a brake pedal 85, and a vehicle speed V from a vehicle speed sensor 87.

Various control signals are output from the HVECU 70 via the output ports respectively. As the signals that are output from the HVECU 70, it is possible to mention, for example, a control signal to the starter motor 25 and a control signal to the alternator 26. It is also possible to mention control signals to the clutch K0 and the automatic transmission device 40 (the oil pressure control device) and a control signal to the DC/DC converter 64. The HVECU 70 is connected to the engine ECU 24 and the motor ECU 34 via the communication ports respectively. The HVECU 70 computes a rotational speed ratio Gt of the automatic transmission device 40 by dividing the rotational speed Nin of the input shaft 41 of the automatic transmission device 40 from the rotational speed sensor 41a by the rotational speed Nout of the output shaft 42 of the automatic transmission device 40 from the rotational speed sensor 42a.

In the hybrid electric vehicle 20 of the embodiment thus configured, the engine 22, the clutch K0, the motor 30, and the automatic transmission device 40 are controlled such that the hybrid electric vehicle 20 runs in a hybrid running mode (an HV running mode) or an electric running mode (an EV running mode) through cooperative control by the HVECU 70, the engine ECU 24, and the motor ECU 34. It should be noted herein that the HV running mode is a mode in which the hybrid electric vehicle 20 runs through the use of the motive power of the engine 22 with the clutch K0 engaged, and that the EV running mode is a mode in which the hybrid electric vehicle 20 runs without using the motive power of the engine 22 with the clutch K0 released.

In the control of the automatic transmission device 40 in the HV running mode or the EV running mode, the HVECU 70 first sets a target shift speed M* of the automatic transmission 45 based on the accelerator depression amount Acc and the vehicle speed V. Then, when a shift speed M of the automatic transmission 45 coincides with the target shift speed M*, the HVECU 70 controls the automatic transmission 45 such that the shift speed M is maintained. On the other hand, when the shift speed M and the target shift speed M* are different from each other, the HVECU 70 controls the automatic transmission 45 such that the shift speed M coincides with the target shift speed M*.

In the control of the engine 22 and the motor 30 in the HV running mode, the HVECU 70 first sets a required torque Tout* that is required for running (required of the output shaft 42 of the automatic transmission device 40) based on the accelerator depression amount Acc and the vehicle speed V. Subsequently, the HVECU 70 sets a value obtained by dividing the required torque Tout* of the output shaft 42 by the rotational speed ratio Gt of the automatic transmission device 40 as a required torque Tin* of the input shaft 41. Upon setting the required torque Tin* of the input shaft 41 in this manner, the HVECU 70 sets a target torque Te* of the engine 22 and a torque command Tm* of the motor 30 such that the required torque Tin* is output to the input shaft 41, transmits the target torque Te* of the engine 22 to the engine ECU 24, and transmits the torque command Tm* of the motor 30 to the motor ECU 34. Upon receiving the target torque Te*, the engine ECU 24 performs operation control (intake air amount control, fuel injection control, ignition control, and the like) of the engine 22 such that the engine 22 is operated with the target torque Te*. Upon receiving the torque command Tm*, the motor ECU 34 performs switching control of the switching elements of the inverter 32 such that the motor 30 is driven with the torque command Tm*.

In the control of the motor 30 in the EV running mode, the HVECU 70 sets the required torque Tin* of the input shaft 41 in the same manner as in the HV running, sets the torque command Tm* of the motor 30 such that the required torque Tin* is output to the input shaft 41, and transmits the torque command Tm* to the motor ECU 34. Upon receiving the torque command Tm*, the motor ECU 34 performs switching control of the switching elements of the inverter 32 such that the motor 30 is driven with the torque command Tm*.

Subsequently, the behavior of the hybrid electric vehicle 20 of the embodiment thus configured, especially the behavior of the hybrid electric vehicle 20 in removing the deposits deposited in the vicinity of a tip of the in-cylinder injection valve 127 of the engine 22 will be described. Thermoplastic deposits are considered to be deposited in the vicinity of the tip of the in-cylinder injection valve 127 when a temperature Test of the tip of the in-cylinder injection valve 127 is not very high (e.g., lower than 150° C. or 140° C.), and thermosetting deposits are considered to be deposited in the vicinity of the tip of the in-cylinder injection valve 127 when the temperature Test of the tip is equal to or higher than a certain high temperature (e.g., 150° C.). The temperature Test of the tip of the in-cylinder injection valve 127 is estimated to tend to rise as the intake air amount Qa increases and as the coolant temperature Tw rises. In the embodiment, therefore, a relationship among the intake air amount Qa, the coolant temperature Tw, and the temperature Test of the tip is obtained in advance and stored as a tip temperature setting map, and the temperature Test of the tip is estimated by deriving the corresponding temperature Test of the tip from the map when the intake air amount Qa and the coolant temperature Tw are given.

When the in-cylinder injection valve 127 is arranged in the vicinity of the ignition plug 130 as is the case with the engine 22 of the embodiment, fuel is injected in a sprayed manner from the in-cylinder injection valve 127, and the air-fuel mixture is ignited in synchronization with fuel injection, the temperature Test of the tip of the in-cylinder injection valve 127 is high to some extent, so thermosetting deposits are also deposited in the vicinity of the tip. Thermoplastic deposits can be removed through fuel injection with a pressure PH of fuel supplied to the in-cylinder injection valve 127 set equal to or higher than a first predetermined pressure P1 (e.g., equal to or higher than 15 MPa). Thermosetting deposits can be removed through fuel injection with the pressure (fuel pressure) PH of the fuel supplied to the in-cylinder injection valve 127 set equal to or higher than a second predetermined pressure P2 higher than the first predetermined pressure (e.g., equal to or higher than 20 MPa). It can be determined that thermoplastic deposits need to be removed, for example, when a first counter C1 that is counted up every time fuel injection is carried out with the coolant temperature Tw of the engine 22 equal to or higher than a certain temperature (e.g., 70° C.), with the fuel pressure PH lower than the first predetermined pressure P1, and with the estimated temperature Test of the tip of the in-cylinder injection valve 127 lower than 150° C. and that is counted down every time fuel injection is carried out with the fuel pressure PH equal to or higher than the first predetermined pressure P1 indicates a value equal to or larger than a first predetermined value Cref1. It can be determined that thermosetting deposits need to be removed, for example, when a second counter C2 that is counted up every time fuel injection is carried out with the coolant temperature Tw of the engine 22 equal to or higher than a certain temperature (e.g., 70° C.) and with the estimated temperature Test of the tip of the in-cylinder injection valve 127 equal to or higher than 150° C. and that is counted down every time fuel injection is carried out with the fuel pressure PH equal to or higher than the second predetermined pressure P2 indicates a value equal to or larger than a second predetermined value Cref2, and a request to remove the thermosetting deposits is made.

Figure 3:
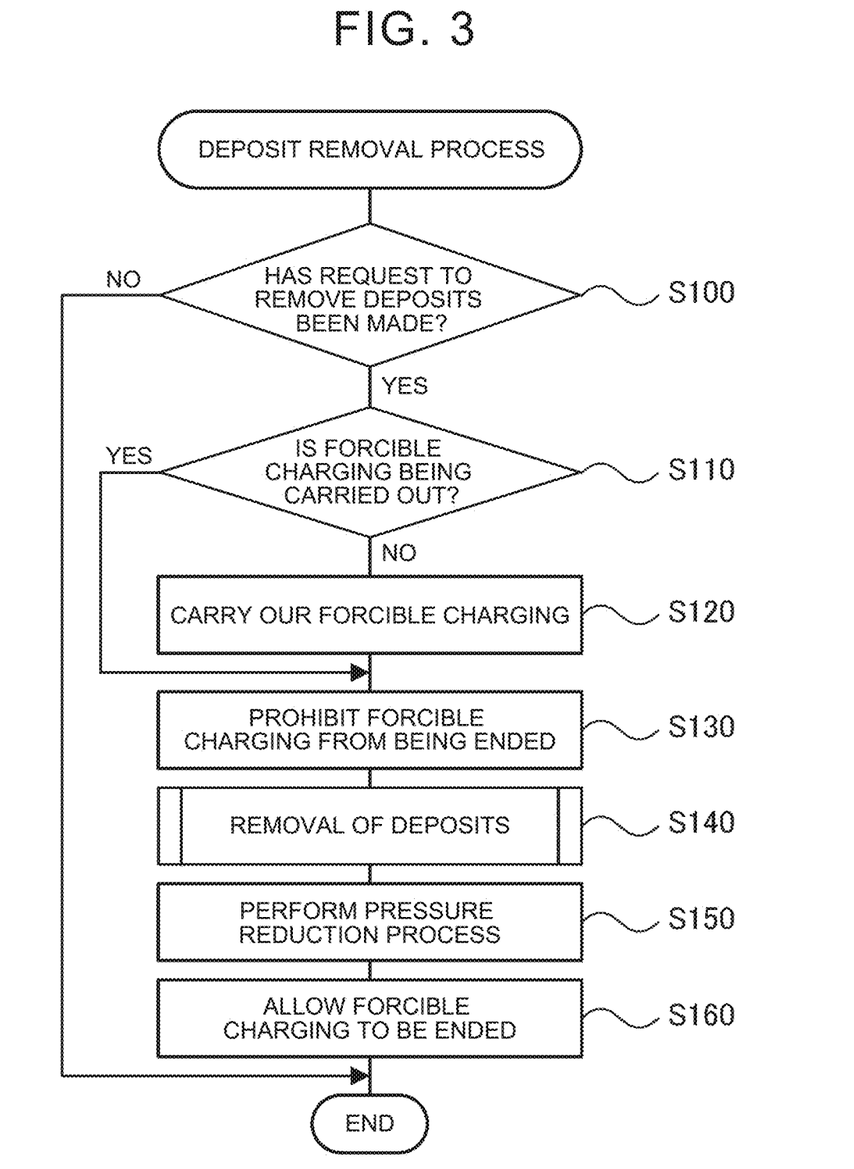
FIG. 3 is a flowchart showing an example of a deposit removal process that is performed by an engine ECU 24.

FIG. 3 is a flowchart showing an example of a deposit removal process that is performed by the engine ECU 24 in removing thermosetting deposits. In the deposit removal process, the engine ECU 24 first determines whether or not a request to remove thermosetting deposits has been made (step S100). It is possible to determine whether or not a request to remove thermosetting deposits has been made, depending on whether or not a request to remove the deposits has been made in response to an estimation that the deposits in a predetermined amount or more are deposited in the vicinity of the tip of the in-cylinder injection valve 127 on the grounds that, for example, the second counter C2 indicates a value equal to or larger than the second predetermined value Cref2, as described above. When it is determined that no request to remove thermosetting deposits has been made, the engine ECU 24 determines that the deposits do not need to be removed, and ends the present process.

When it is determined in step S100 that a request to remove thermosetting deposits has been made, the engine ECU 24 determines whether or not forcible charging for forcibly charging the high-voltage battery 60 is being carried out (step S110). When it is determined that the forcible charging of the high-voltage battery 60 is not being carried out, the engine ECU 24 carries out the forcible charging of the high-voltage battery 60 (step S120). The forcible charging of the high-voltage battery 60 is carried out by setting the sum of a running required power Pdrv that is required for running and a charging required power Pchg for forcible charging as a required power Pe* to be output from the engine 22, performing driving control of the engine 22, generating an electric power by the motor 30 through the use of a differential power (the charging required power Pchg) between the running required power Pdrv and the required power Pe*, and charging the high-voltage battery 60 with the generated electric power. Incidentally, while the hybrid electric vehicle 20 is stopped, the running required power Pdrv is 0, so the engine ECU 24 performs driving control of the engine 22 such that the charging required power Pchg is output from the engine 22.

When it is determined in step S110 that the forcible charging of the high-voltage battery 60 is being carried out or after the forcible charging of the high-voltage battery 60 is carried out in step S120, the engine ECU 24 prohibits the forcible charging of the high-voltage battery 60 from being ended (step S130), and performs the process of removing thermosetting deposits (step S140). The process of removing thermosetting deposits can be performed by, for example, setting the pressure (fuel pressure) PH of the fuel supplied to the in-cylinder injection valve 127 equal to or higher than the second predetermined pressure P2 (e.g., equal to or higher than 20 MPa), and injecting fuel from the in-cylinder injection valve 127 until the second counter C2 that is counted down every time fuel injection is carried out indicates 0. A case where the process of removing thermosetting deposits is performed when the engine 22 is in idling operation without forcibly charging the high-voltage battery 60 will now be considered. When fuel is injected from the in-cylinder injection valve 127 with the fuel pressure PH set equal to the second predetermined pressure P2 (e.g., 20 MPa), a minimum fuel injection amount Qmin of fuel that can be injected from the in-cylinder injection valve 127 may become larger than an idling fuel injection amount Qidl that is required for idling operation of the engine 22. In this case, fuel in the minimum fuel injection amount Qmin is injected from the in-cylinder injection valve 127, so fuel in an amount that is excessively larger than the idling fuel injection amount Qidl is injected. In this case, the amount of fuel injection becomes excessively large. Unburnt fuel is discharged to cause a deterioration in emission properties unless the intake air amount Qa is adjusted. When the intake air amount Qa is adjusted, the output of the engine 22 becomes excessively large, and as a result, the unexpected racing of the engine 22 occurs, or a torque is output unexpectedly. When the process of removing thermosetting deposits is performed during the forcible charging of the high-voltage battery 60 as in the embodiment, a fuel injection amount Qf that is needed to output the charging required power Pchg from the engine 22 can be made equal to or larger than the minimum fuel injection amount Qmin. Therefore, fuel in the fuel injection amount Qf is injected from the in-cylinder injection valve 127, and a deterioration in emission properties, the unexpected racing of the engine 22, and the unexpected outputting of a torque can be suppressed.

When the process of removing deposits is ended, the engine ECU 24 performs a pressure reduction process for reducing the pressure of fuel (fuel pressure) PH supplied to the in-cylinder injection valve 127 to a normal pressure that is needed to output the required power Pe* from the engine 22 (step S150). The pressure reduction process can be performed by injecting fuel from the in-cylinder injection valve 127 until the fuel pressure PH becomes a normal pressure. The forcible charging of the high-voltage battery 60 is continued even during this pressure reduction process. Therefore, the occurrence of inconveniences resulting from the injection of fuel in the minimum fuel injection amount Qmin from the in-cylinder injection valve 127 after a decrease in the fuel injection amount Qf of the in-cylinder injection valve 127 below the minimum fuel injection amount Qmin, namely, a deterioration in emission properties, the unexpected racing of the engine 22, and the unexpected outputting of a torque can be suppressed.

When the pressure reduction process is ended, the engine ECU 24 allows the forcible charging of the high-voltage battery 60 to be ended (step S160), and ends the present process. A request to end the forcible charging of the high-voltage battery 60 is made when an electric storage rate SOC of the high-voltage battery 60 is equal to or higher than a threshold determined in advance. The engine ECU 24 ends the forcible charging of the high-voltage battery 60 after confirming that the ending thereof is allowed.

In the hybrid electric vehicle 20 of the embodiment, the fuel injection amount Qf of the in-cylinder injection valve 127 can be made equal to or larger than the minimum fuel injection amount Qmin by removing thermosetting deposits deposited in the vicinity of the tip of the in-cylinder injection valve 127 during the forcible charging of the high-voltage battery 60. Thus, the occurrence of inconveniences resulting from the injection of fuel in the minimum fuel injection amount Qmin from the in-cylinder injection valve 127 after a decrease in the fuel injection amount Qf of the in-cylinder injection valve 127 below the minimum fuel injection amount Qmin, namely, a deterioration in emission properties, the unexpected racing of the engine 22, and the unexpected outputting of a torque can be suppressed. Besides, in the hybrid electric vehicle 20 of the embodiment, the forcible charging of the high-voltage battery 60 is continued until the pressure reduction process for reducing the fuel pressure PH is ended after the end of the removal of thermosetting deposits. Thus, the occurrence of inconveniences resulting from the injection of fuel in the minimum fuel injection amount Qmin from the in-cylinder injection valve 127 after a decrease in the fuel injection amount Qf of the in-cylinder injection valve 127 below the minimum fuel injection amount Qmin can be suppressed in reducing the fuel pressure PH as well. As a result, the occurrence of inconveniences resulting from the injection of fuel in the minimum fuel injection amount Qmin larger than the fuel injection amount Qf from the in-cylinder injection valve 127 after a decrease in the fuel injection amount Qf of the in-cylinder injection valve 127 below the minimum fuel injection amount Qmin at the time of the process of removing thermosetting deposits or the subsequent pressure reduction process can be suppressed.

In the hybrid electric vehicle 20 of the embodiment, if the high-voltage battery 60 is not forcibly charged when a request to remove thermosetting deposits is made, the forcible charging of the high-voltage battery 60 is carried out to remove the deposits. However, the thermosetting deposits may not be removed if the high-voltage battery 60 is not forcibly charged when a request to remove the deposits is made. In this case, a deposit removal process of FIG. 4 may be performed instead of the deposit removal process of FIG. 3.

Figure 4:
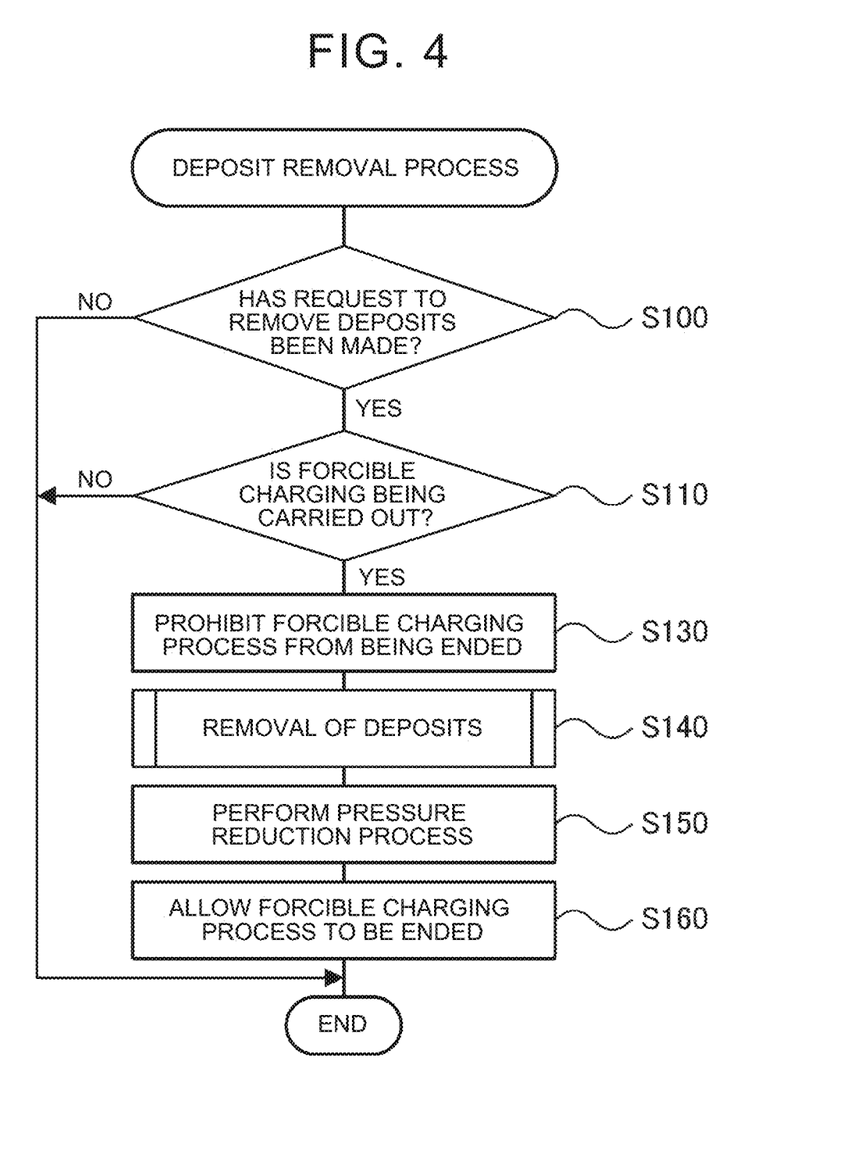
FIG. 4 is a flowchart showing an example of a deposit removal process of a modification example.

In the deposit removal process of FIG. 4, the deposit removal process is ended without being performed if it is determined in step S100 that no request to remove thermosetting deposits has been made or if it is determined in step S110 that the forcible charging of the high-voltage battery 60 is not being carried out even when it is determined that a request to remove thermosetting deposits has been made. When it is determined in step S100 that a request to remove thermosetting deposits has been made and it is determined in step S110 that the forcible charging of the high-voltage battery 60 is being carried out, the engine ECU 24 prohibits the forcible charging of the high-voltage battery 60 from being ended (step S130), and performs the process of removing thermosetting deposits (step S140). Then, after the end of removal of the deposits, the engine ECU 24 performs the pressure reduction process for injecting fuel from the in-cylinder injection valve 127 until the fuel pressure PH becomes a normal pressure (step S150), then allows the forcible charging of the high-voltage battery 60 to be ended (step S160), and ends the present process. In this case as well, an effect similar to that of the embodiment is exerted.

In the hybrid electric vehicle 20 of the embodiment, when the process of removing thermosetting deposits is performed during the forcible charging of the high-voltage battery 60, the forcible charging of the high-voltage battery 60 is prohibited from being ended before performing the deposit removal process, and the forcible charging of the high-voltage battery 60 is allowed to be ended after the end of the pressure reduction process following the deposit removal process. However, when the process of removing thermosetting deposits is performed during the forcible charging of the high-voltage battery 60, the forcible charging of the high-voltage battery 60 may not be prohibited from being ended before performing the deposit removal process, and the process of removing deposits and the pressure reduction process may be ended before ending the forcible charging of the high-voltage battery 60. For example, a deposit removal process of FIG. 5 may be performed instead of the deposit removal process of FIG. 4.

Figure 5:
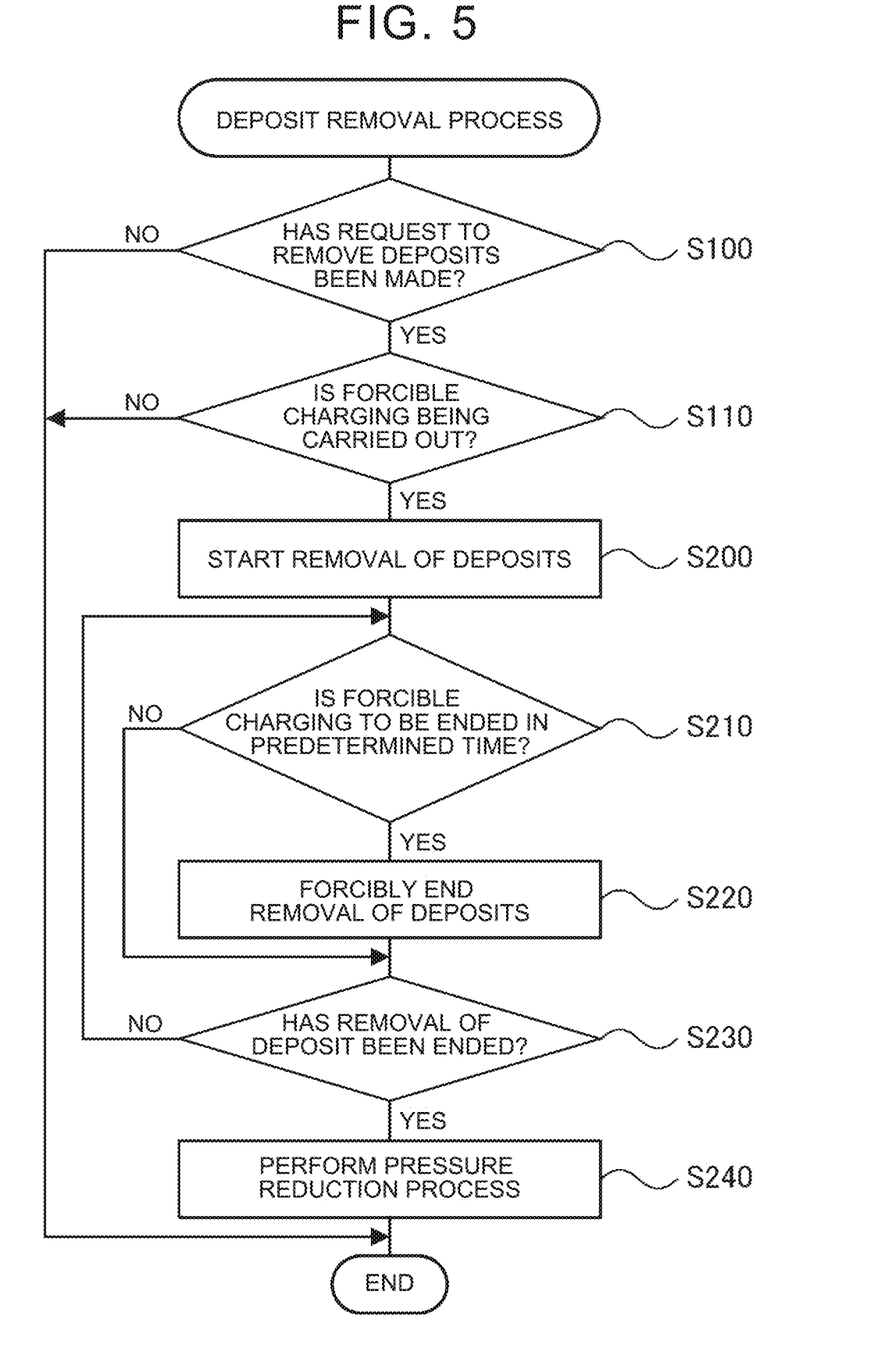
FIG. 5 is a flowchart showing an example of a deposit removal process of another modification example.

In the deposit removal process of FIG. 5, the deposit removal process is ended without being performed if it is determined in step S100 that no request to remove thermosetting deposits has been made or if it is determined in step S110 that the forcible charging of the high-voltage battery 60 is not being carried out even when it is determined that a request to remove thermosetting deposits has been made. When it is determined in step S100 that a request to remove thermosetting deposits has been made and it is determined in step S110 that the forcible charging of the high-voltage battery 60 is being carried out, the engine ECU 24 starts the deposit removal process (step S200), and repeats the processing of steps S210 to S230 until the deposit removal process is ended. In this repeated processing, the engine ECU 24 determines whether or not the forcible charging of the high-voltage battery 60 is to be ended in a predetermined time (step S210). It should be noted herein that the predetermined time is slightly longer than a time that is needed to perform the pressure reduction process for injecting fuel from the in-cylinder injection valve 127 until the fuel pressure PH becomes a normal pressure. For example, three or four seconds can be used as the predetermined time. When it is determined in step S210 that the forcible charging of the high-voltage battery 60 is not to be ended in the predetermined time, the engine ECU 24 determines whether or not the deposit removal process has been ended (step S230). When it is determined that the deposit removal process has not been ended, the engine ECU 24 returns to the processing of step S210 for determining whether or not the forcible charging of the high-voltage battery 60 is to be ended in the predetermined time. Accordingly, these processing steps are designed to wait for the deposit removal process to be ended by a timing preceding the end of the forcible charging of the high-voltage battery 60 by the predetermined time. When it is determined in step S210 that the forcible charging of the high-voltage battery 60 is to be ended in the predetermined time, the engine ECU 24 forcibly ends the deposit removal process (step S220), and determines whether or not the deposit removal process has been ended (step S230). In this case, since the deposit removal process has been forcibly ended, it is determined that the deposit removal process has been ended. Accordingly, it is determined in step S230 that the deposit removal process has been ended, in the case where the deposit removal process is ended at a timing preceding the end of the forcible charging of the high-voltage battery 60 by the predetermined time, or in the case where the deposit removal process is forcibly ended when the forcible charging of the high-voltage battery 60 is to be ended in the predetermined time. When it is determined in step S230 that the deposit removal process has been ended, the engine ECU 24 performs the pressure reduction process for injecting fuel from the in-cylinder injection valve 127 until the fuel pressure PH becomes a normal pressure (step S240), and ends the present process. In this case as well, the occurrence of inconveniences resulting from the injection of fuel in the minimum fuel injection amount Qmin larger than the fuel injection amount Qf from the in-cylinder injection valve 127 after a decrease in the fuel injection amount Qf of the in-cylinder injection valve 127 below the minimum fuel injection amount Qmin at the time of the process of removing thermosetting deposits or the subsequent pressure reduction process can be suppressed, as is the case with the embodiment.

In the deposit removal process of FIG. 5, when the deposit removal process is not ended by the timing preceding the end of the forcible charging of the high-voltage battery 60 by the predetermined time, the deposit removal process is forcibly ended, and the pressure reduction process for injecting fuel from the in-cylinder injection valve 127 until the fuel pressure PH becomes a normal pressure during the predetermined time is performed. However, when the deposit removal process is not ended by the timing when a request to end the forcible charging of the high-voltage battery 60 is made, the deposit removal process may be forcibly ended, the end of the forcible charging of the high-voltage battery 60 may be delayed by a predetermined time, and the pressure reduction process may be performed in the meantime.

The hybrid electric vehicle 20 of the embodiment is equipped with the automatic transmission 45 having six speeds. However, the hybrid electric vehicle 20 may be equipped with an automatic transmission having, for example, four, five, or eight speeds.

The hybrid electric vehicle 20 of the embodiment is mounted with the engine 22 having the port injection valve 126 and the in-cylinder injection valve 127. However, the hybrid electric vehicle 20 may be mounted with an engine that does not have any port injection valve but has only an in-cylinder injection valve.

The hybrid electric vehicle 20 of the embodiment is mounted with the engine 22 having the in-cylinder injection valve 127 arranged in the vicinity of the ignition plug 130 substantially at the center of the top of the combustion chamber 129. However, the hybrid electric vehicle 20 may be mounted with an engine having an ignition plug arranged substantially at the center of a top of a combustion chamber and an in-cylinder injection valve arranged on a lateral portion of the combustion chamber.

The hybrid electric vehicle 20 of the embodiment is equipped with the engine ECU 24, the motor ECU 34, and the HVECU 70. However, at least two of these ECU's may be configured integrally.

In the embodiment, the disclosure is applied to the hybrid electric vehicle 20 configured such that the crankshaft 23 of the engine 22 and the rotary shaft 31 of the motor 30 are connected to each other via the clutch K0 and that the input shaft 41 and the output shaft 42 of the automatic transmission device 40 are connected to the differential gear 48 to which the rotary shaft 31 of the motor 30 and the driving wheels 49 are coupled. However, the disclosure may be applied to a hybrid electric vehicle having any configuration as long as the hybrid electric vehicle is equipped with an engine, a motor that can generate an electric power through the use of a motive power output from the engine and that can output a running motive power, and an electrical storage device that can exchange electric power with the motor.

A corresponding relationship between the main elements of the embodiment and the main elements of the disclosure described in the section of means for solving the problem will be described. In the embodiment, the engine 22 corresponds to "the engine", the fuel supply device 150 corresponds to "the fuel supply device", the motor 30 corresponds to "the motor", the high-voltage battery 60 corresponds to "the electrical storage device", and the HVECU 70, the engine ECU 24, and the motor ECU 34 correspond to "the control device".

Incidentally, the corresponding relationship between the main elements of the embodiment and the main elements of the disclosure described in the section of means for solving the problem does not limit the elements of the disclosure described in the section of means for solving the problem, since the embodiment is an example for concretely illustrating the mode for carrying out the disclosure described in the section of means for solving the problem. That is, the disclosure described in the section of means for solving the problem should be interpreted based on what is described in the section, and the embodiment is nothing more than a concrete example of the disclosure described in the section of means for solving the problem.

Although the mode for carrying out the disclosure has been described above through the use of the embodiment, it is obvious that the disclosure should not be limited at all to the embodiment, and that the disclosure can be carried out in various modes within such a range as not to depart from the gist of the disclosure.

The disclosure can be utilized in, for example, a manufacturing industry of engine devices.

What is claimed is:

1. A hybrid electric vehicle, comprising:
an engine having an in-cylinder injection valve;
a fuel supply device configured to supply fuel to the in-cylinder injection valve;
a motor configured to
generate an electric power through use of a motive power output from the engine, and
output a running motive power;
an electrical storage device configured to exchange the electric power with the motor; and
a control device configured to control the engine, the fuel supply device, and the motor, wherein
the control device is configured to
during performance of a forcible charging process for the electrical storage device, perform a deposit removal process in which thermoplastic deposits that have adhered to the in-cylinder injection valve are removed by setting a pressure of fuel supplied to the in-cylinder injection valve to a predetermined pressure higher than a normal pressure and injecting fuel from the in-cylinder injection valve, the predetermined pressure being a fuel pressure at which the thermoplastic deposits are removed from the in-cylinder injection valve, and
continue the forcible charging process until the pressure of fuel is returned to the normal pressure after end of the deposit removal process.

2. The hybrid electric vehicle according to claim 1, wherein
the forcible charging process is a process in which
(i) the engine is controlled to output a first motive power larger than the running motive power that is required for running,
(ii) the motor is controlled to generate a further electric power through a second motive power obtained by subtracting the running motive power from the first motive power output from the engine, and
(iii) the electrical storage device is charged by the further electric power generated by the motor.

3. The hybrid electric vehicle according to claim 1, wherein
the engine has
the in-cylinder injection valve arranged in a vicinity of a center of a top of a cylinder, and
an ignition plug arranged in a vicinity of the in-cylinder injection valve.

4. The hybrid electric vehicle according to claim 2, wherein
the control device is configured to, in response to receiving a request to remove the thermoplastic deposits, determine whether the forcible charging process is being carried out.

5. The hybrid electric vehicle according to claim 4, wherein
the control device is configured to, in response to determining the forcible charging process being carried out, perform the deposit removal process.

6. The hybrid electric vehicle according to claim 5, wherein
the control device is configured to, in response to determining the forcible charging process being not carried out,
carry out the forcible charging process, and
after carrying out the forcible charging process, perform the deposit removal process.

7. The hybrid electric vehicle according to claim 5, wherein
the control device is configured to, in response to determining the forcible charging process being not carried out, not perform the deposit removal process.

8. The hybrid electric vehicle according to claim 7, wherein
the control device is configured to, during the deposit removal process being performed, determine whether or not the forcible charging process is to be ended in a predetermined time, the predetermined time being longer than a time needed for the pressure of fuel to return to the normal pressure.

9. The hybrid electric vehicle according to claim 8, wherein
the control device is configured to, in response to the deposit removal process not ending by a timing preceding an end of the forcible charging process by the predetermined time, end the deposit removal process.

10. The hybrid electric vehicle according to claim 1, wherein
the control device is configured to, in response to receiving a request to remove the thermoplastic deposits, determine whether the forcible charging process is being carried out.

11. The hybrid electric vehicle according to claim 10, wherein
the control device is configured to, in response to determining the forcible charging process being carried out, perform the deposit removal process.

12. The hybrid electric vehicle according to claim 11, wherein
the control device is configured to, in response to determining the forcible charging process being not carried out,
carry out the forcible charging process, and
after carrying out the forcible charging process, perform the deposit removal process.

13. The hybrid electric vehicle according to claim 11, wherein
the control device is configured to, in response to determining the forcible charging process being not carried out, not perform the deposit removal process.

14. The hybrid electric vehicle according to claim 13, wherein
the control device is configured to, during the deposit removal process being performed, determine whether or not the forcible charging process is to be ended in a predetermined time, the predetermined time being longer than a time needed for the pressure of fuel to return to the normal pressure.

15. The hybrid electric vehicle according to claim 14, wherein
the control device is configured to, in response to the deposit removal process not ending by a timing preceding an end of the forcible charging process by the predetermined time, end the deposit removal process.

* * * * *